(12) United States Patent  
Chatterjee et al.

(10) Patent No.: US 8,482,381 B2
(45) Date of Patent: Jul. 9, 2013

(54) MULTI-PURPOSE DETECTOR-BASED INPUT FEATURE FOR A COMPUTING DEVICE

(75) Inventors: Manjirnath Chatterjee, San Francisco, CA (US); Eric Liu, Santa Clara, CA (US); Nathaniel Wolf, San Francisco, CA (US)

(73) Assignee: Palm, Inc., Sunnyvale, CA (US)

( * ) Notice: Subject to any disclaimer, the term of this patent is extended or adjusted under 35 U.S.C. 154(b) by 1189 days.

(21) Appl. No.: 12/184,241

(22) Filed: Jul. 31, 2008

(65) Prior Publication Data

US 2010/0027854 A1 Feb. 4, 2010

(51) Int. Cl.
*H04Q 9/00* (2006.01)
(52) U.S. Cl.
USPC ........................................ 340/5.52
(58) Field of Classification Search
USPC .............. 340/5.52, 5.8, 3.1, 6.1; 200/512
See application file for complete search history.

(56) References Cited

U.S. PATENT DOCUMENTS

| | | | |
|---|---|---|---|
| 6,323,449 B1 * | 11/2001 | Janniere | 200/408 |
| 6,337,918 B1 * | 1/2002 | Holehan | 382/124 |
| 6,429,846 B2 * | 8/2002 | Rosenberg et al. | 345/156 |
| 7,829,812 B2 * | 11/2010 | Tolbert et al. | 200/600 |
| 2004/0239624 A1 | 12/2004 | Ramian | |
| 2007/0139374 A1 * | 6/2007 | Harley | 345/157 |

FOREIGN PATENT DOCUMENTS

| | | |
|---|---|---|
| EP | 1 835 386 A2 | 9/2007 |
| JP | 2006-010457 A | 1/2006 |

OTHER PUBLICATIONS

International Preliminary Report on Patentability, International Application No. PCT/US2009/052302, Date of Issuance: Feb. 1, 2011, pp. 1-5.
International Search Report and Written Opinion, International Application No. PCT/US2009/052302, Date of Completion: Feb. 24, 2010, Date of Mailing: Feb. 26, 2010, pp. 1-11.

* cited by examiner

*Primary Examiner* — Vernal Brown

(57) ABSTRACT

An input feature is provided for a computing device. The input feature is multi-dimensional in ability to detect position information, applied pressure and/or biometric characteristics about the user or finger. The input feature may also include a haptic feedback mechanism.

38 Claims, 12 Drawing Sheets

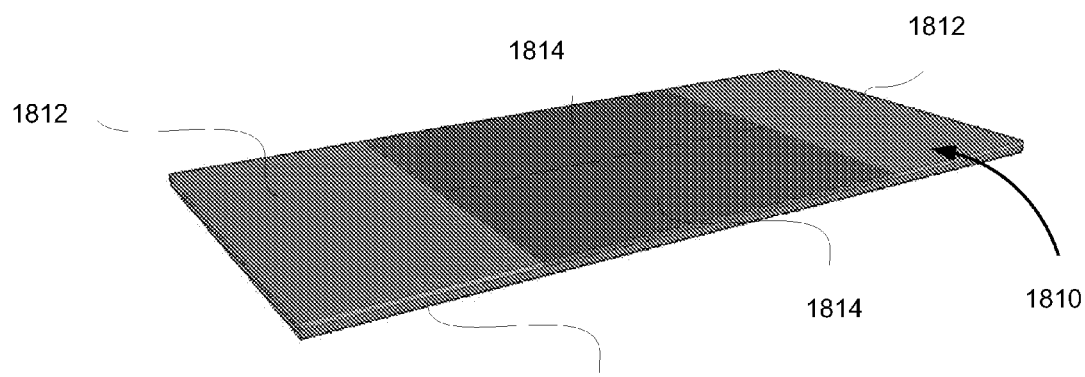
FIG. 18A
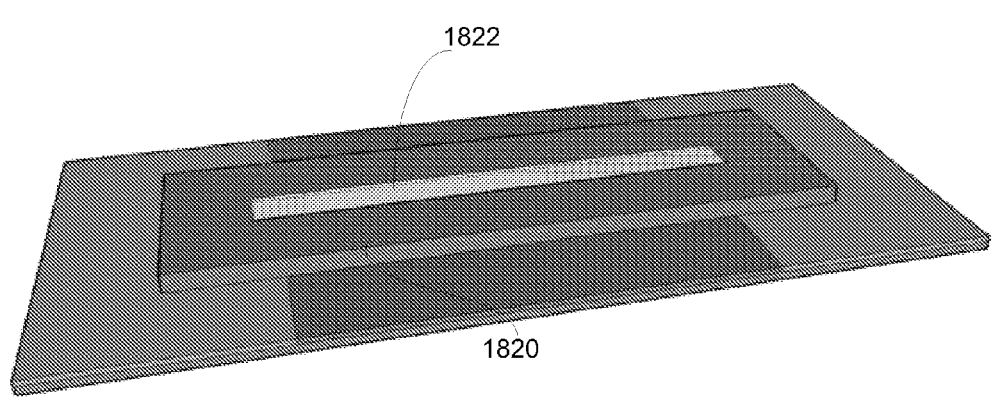
FIG. 18B
FIG. 18C
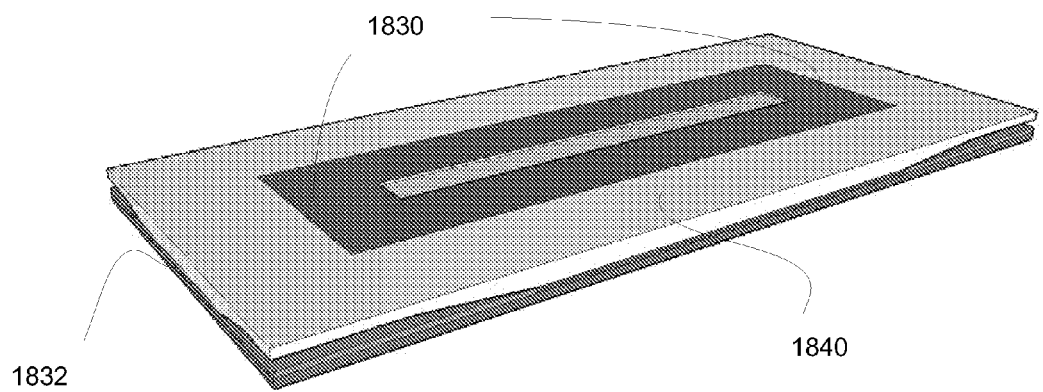

MULTI-PURPOSE DETECTOR-BASED INPUT FEATURE FOR A COMPUTING DEVICE

TECHNICAL FIELD

The disclosed embodiments relate to input features for computing devices. In particular, the disclosed embodiments relate to a multi-purpose detector-based input feature for a computing device.

BACKGROUND

There are numerous forms of multi-purpose input features for computing devices. One common input device is a multi-directional and selection input mechanism that enables four or more directional inputs (north, south, east, west) and center (i.e. '5-way'). Such input features have traditionally been provided through button combinations and designs, so to provide a mechanical solution. However, the use of buttons requires surface area on the device to implement. The button set solution hinders design goals for making computing devices smaller in form factor.

Biometrics sensors are commonly used today for security purposes as an authentication tool. Typically, such sensors scan a finger swipe to validate the identity of the user. Such sensors have been used as a device navigation tool, as well for simple scrolling either left/right or up/down. However, this has been less than optimal as there is no current implementation that allows for the center press. One typical implementation allows for a timing-based "tap" to be interpreted as a center press. However, such timing-based techniques often result in accidental taps. Also, the biometric sensor does not give any physical haptic feedback to the user that scrolling is occurring. Thus the mechanical solutions are more usable.

BRIEF DESCRIPTION OF THE DRAWINGS

FIG. 18A through FIG. 18C illustrate a stack formation for component layers of a multi-dimensional input feature such as shown and described with numerous embodiments.

DETAILED DESCRIPTION

Figure 1:
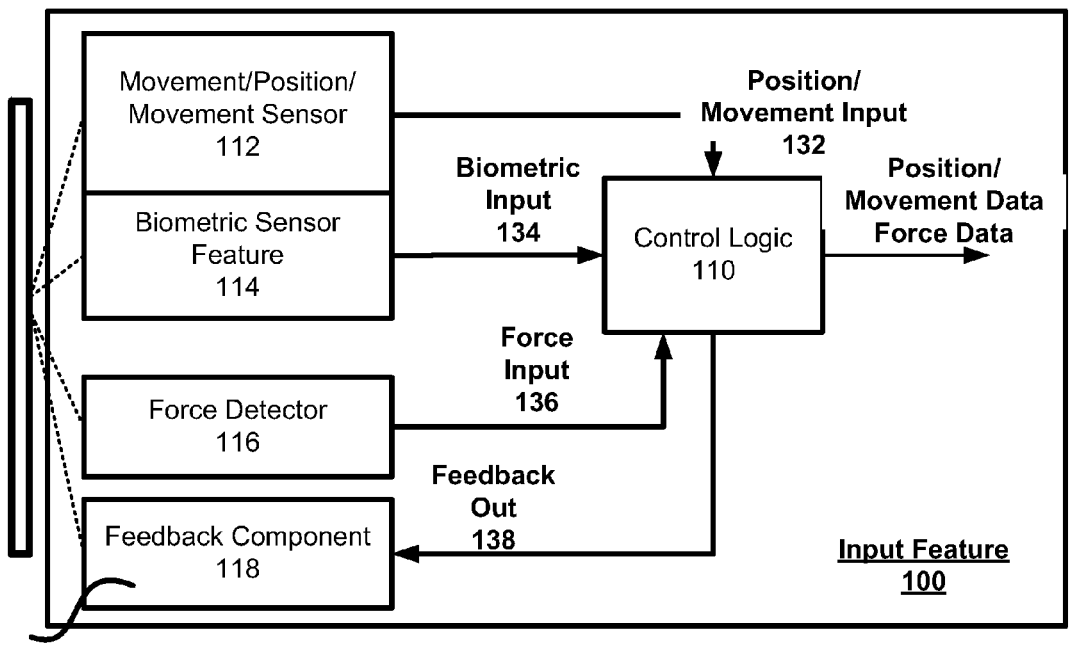
FIG. 1 illustrates a multi-purpose input feature for use with a computing device, according to an embodiment.

Embodiments described herein provide for a multi-purpose detector-based input feature for computing devices. In particular, one or more embodiments provide for an input interface that enables features such as ability to detect position information, applied pressure and/or biometric characteristics about the user or finger. The input feature may also include a haptic feedback mechanism. Among other benefits, the dimensional requirements for providing input features is reduced, as compared to conventional approaches that use button sets. Moreover, the optional integrated use of biometric sensors provides a measure of security and convenience.

In one embodiment, an input feature is provided that includes (i) a biometric position information sensor to detect position information and biometric characteristics about a user's finger that is placed on at least a portion of the designated region; and (ii) one or more force detectors to measure or detect an applied pressure of the finger at one or more locations of the designated region As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Embodiments described herein generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistants or laptop computers. Thus, memory, processing and network resources may all be used in connection with the establishment, use or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

FIG. 1 illustrates a multi-purpose input feature for use with a computing device, according to an embodiment. An input feature 100 such as described may combine functionality from a plurality of sensors and/or detectors. In one embodiment, the functionality provided by the various sensors and detectors are provided as an alternative to more conventional button-style user-interface features, such as 5-way button sets used on some mobile computing devices. Additionally, some embodiments enable the input feature 100 to protect the computing device and/or some of its resources from unauthorized or unwanted use or access.

The input feature 100 may include control logic 110 combined with different types of sensors and detectors, as well as optionally a feedback element. Numerous types of sensors or detectors may be provided with the input feature 100. Depending on the embodiment or implementation, the input feature may comprise a combination of some or all of (i) a movement/position sensor 112, (ii) a biometric sensor feature 114, (iii) a set of one or more force detectors 116, and (iv) a feedback component 118. Not all of the elements are required to implement an input feature, under embodiments described herein. For example, one embodiment combined biometric sensor feature 114 in with the one or more force detectors 116 and excludes the feedback component 118. Another embodiment may utilize the feedback component 118 in combination with the movement/position sensor 112 and/or the biometric sensor 114, but not the force detector 116.

In an embodiment, input feature 100 is provided as a single integrated component. As such, the input feature 100 may form a single component during a manufacturing or assembly process. Alternatively, the input feature may be provided by multiple distinct elements that operate independently but are used together.

In one embodiment, the movement/position sensor 112 detects the placement of an object in a designated region 102 of a housing surface of the computing device. In addition to placement, the movement/position sensor 112 may be configured to detect one or more of the following (i) the position of the object in the designated region, at least along the direction of one or more axes; (ii) the position of the object at multiple instances, so as, for example, to detect a starting point and finishing point for the movement of the object along a line; (iii) the position of the object at multiple instances as a function of time (i.e. velocity); and/or (iv) acceleration of the object on the designated region 102 of the housing surface. The control logic 110 may acquire position information 132 corresponding to any of the detected quantities. As an illustrative example, the object may correspond to a user's finger. The movement/position sensor 112 may detect the user's placement and/or swipe of his finger over an operative space of the designated region. The position information 132 may indicate the occurrence of the swipe, such as the magnitude or range of motion of the swipe (e.g. the length of the swipe or the starting or stopping points). As an addition or alternative, the position information 132 may indicate a velocity of the swipe, or its acceleration. The control logic 110 may use, or communicate with a processor that uses, the position information to perform one or more actions. These actions may correspond to, for example, scrolling, navigation, or other directional input.

The biometric sensor feature 114 may be configured to detect one or more biometric characteristics of the user's finger. The characteristics may correspond to, for example, a finger print pattern or portion thereof, or alternatively the shape of the user's finger. In one implementation, the biometric sensor feature 114 is integrated or made operative with the movement/position sensor 112. In particular, one embodiment provides that the movement/position sensor 112 and biometric sensor feature 114 are an integrated device that optically detects both the biometric data and the position information. Alternatively, the movement/position sensor 112 may operate independently or semi-independently of the biometric sensor feature 114. For example, the movement/position sensor 112 may include a capacitive or resistive touchpad, while the biometric sensor feature 114 is an optical component that uses light to detect finger-print features.

In an embodiment in which biometric information is detected, the biometric sensor feature 114 may detect one or more characteristics of the user's finger when placed on a portion of the designated region 102. The control logic 110 may identify biometric input 134 from the biometric sensor feature 114, corresponding to the characteristics of the user's fingers. As described below, the biometric input 134 may be used to authorize or authenticate the user. For example, the user may be enabled to unlock the device or access a protected resource (e.g. database) only when the user is approved by the biometric sensor feature 114. Approval or denial may occur in response to control logic 110 or other processing resources of the computing device receiving the biometric input 134.

In another embodiment, the biometric sensor feature 114 may operate as a more simple sensor that detects presence of the user's finger in a conventional orientation, and then performs a device unlock. Such device unlock need not be security-centric, but rather serve to switch the computing device into an operational mode where input can be received. In such an embodiment, the user's finger swipe is detected only as a finger, and the sensor's role is to detect that the user is ready to use the device, rather than as a mechanism for authentication. In comparison to conventional approaches, the user's finger swipe may be detected and used as a substitute for button press combination actions that many conventional devices use to unlock the device. The locked state may be triggered automatically after, for example, a period of inactivity and enable the user to freely carry the device in his pockets without concern that the device will inadvertently dial out.

The force detector 116 may detect applied pressure from an object (e.g. finger or stylus) making contact with one or more locations of the designated region 102. In one embodiment, the force detector 116 only triggers when the applied pressure at a particular location of the designated region 102 exceeds a designated threshold. In such an embodiment, the force detector 116 may detect instances when the applied pressure simulates a button-press in a traditional computing device. In another embodiment, the force detector 116 provides a measurement of the applied pressure at the locations. The control logic 110 may be coupled to the force detector 116 to receive force input 136. As described elsewhere, one or more embodiments provide for the force detector 116 to enable simulation of a button press, such as performed with conventional button style input mechanisms.

According to an embodiment, the input feature 100 is capable of providing the user feedback (sometimes referred to as haptic feedback), in the form of an audible or tactile sensation. In one implementation, the feedback serves the purpose of providing the user with indications that the user's manipulation of the input feature 100 is registering in the manner intended. Additionally, the feedback may enable the input feature 100 to simulate a traditional button press mechanism, which inherently provides the user with feedback. For example, when the user does apply enough pressure to press a button in a conventional device, the buttons traditionally emit a "click" along with a tactile sensation of a snap-dome or mechanical switch collapsing. Likewise, one or more embodiments provide for the feedback mechanism to operate mechanically or through electronic means (e.g. signaled by the control logic 110) to emit feedback in response to some other event corresponding to the user's interaction with the input feature 100 (e.g. user presses a location in the designated region to trigger one of the force sensors). Thus, under one implementation, the control logic 110 (or optionally, another element) may send trigger 138 the feedback component 118 to emit the feedback 139. The trigger 138 may be signaled in response to, for example, events such as (i) the control logic detecting applied force in excess of a designated threshold, and/or (ii) the biometric sensor feature 114 detecting the user is authorized or not authorized. The haptic feedback can additionally be used to transmit other information, such as (i) the occurrences of events or simulations when a game is played on the device (e.g. gun recoil, getting hit); or (ii) responses to programmatic alerts or ringtones.

Figure 2:
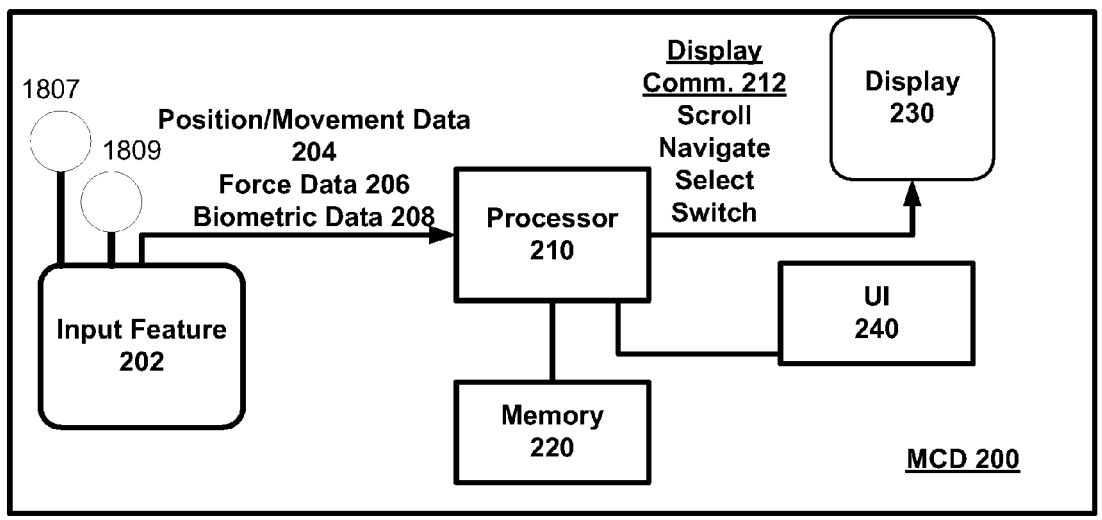
FIG. 2 is a simplified block diagram of a computing device configured to include an input feature, according to an embodiment.

FIG. 2 is a simplified block diagram of a computing device configured to include an input feature, according to an embodiment. A computing device 200 may include input feature 202, processor(s) 210, memory resources 220 and a display 230. Numerous other components may also be included. In one implementation, the computing device corresponds to a cellular telephony data device, such as a so-called "Smart phone" or "mobile companion". Such devices use cellular networks to enable telephony operations, messaging (e.g. email, instant messaging, Short Message Service (SMS), Multimedia Message Service (MMS)) and Internet browsing or other network operations. As an alternative or addition, such devices may enable network connectivity through alternative wireless network mediums, such as Wireless Fidelity (or 'WiFi') as provided under standards such as those set forth by IEEE 802.11(b) or (g). While embodiments described herein focus on cellular telephony data devices, other types of computing devices may also be used with embodiments described herein, including multimedia devices, ultramobile personal computers, GPS units, or cameras/video recorders.

In an embodiment, the device 200 may include a set of user-interface features 240. The user-interface features may include, for example, a keyboard or keypad, a number pad, one or more application buttons or feature buttons, a display screen, soft buttons, microphone or speakers or other components.

The input feature 202 may operate in accordance with any of the embodiments described. Accordingly, input feature 202 may signal data corresponding to position/movement data 204 (such as provided by finger placement or swipe), force data 206 and/or biometric data 208 to the processor 210. In an embodiment in which the input feature uses resistive type position sensors to detect finger/object placement and position, the position information 204 may translate to coordinates or other position information. However, as described with some embodiments, an optical, capacitive or RF sensor may be used to detection position information and optionally biometric data. In such cases, the position/movement data 204 may correspond to optical data (such as an image) that indicates a swipe or motion or movement of the finger or object. Control logic 110 (FIG. 1) may be provided with the input feature 202, the processor 210 and/or distributed between or on both elements. Thus, the various kinds of data signaled from the input feature 202 may correspond to either raw data or processed data (e.g. measurements in formatted form or expressed as values).

The processor 210 may receive the data from the input feature 202 to perform various kinds of operations. Under one embodiment, the processor 210 may receive the data to process the data as directional input (e.g. scrolling, navigational input), selection input and/or authentication or use data. The processor 210 may also approve or disapprove of the user based on the biometric data 208. In one implementation, the processor 210 stores user/biometric profiles with memory resource 220, and uses the profile to approve or disapprove the user. For example, some or all of the user-interface features 240 may be made operational only after the user is approved. The processor 210 may also signal control information 212 to display 230 to cause the display to perform operations that coincide with input received from the input feature 202. This input may include, for example, displaying scrolling operations (e.g. from entry to entry) or selection operations (e.g. opening a record or application). An embodiment of FIG. 3 describes in more detail the various functionality that may be performed as a result of input received through the input feature 202.

Methodology

Figure 3:
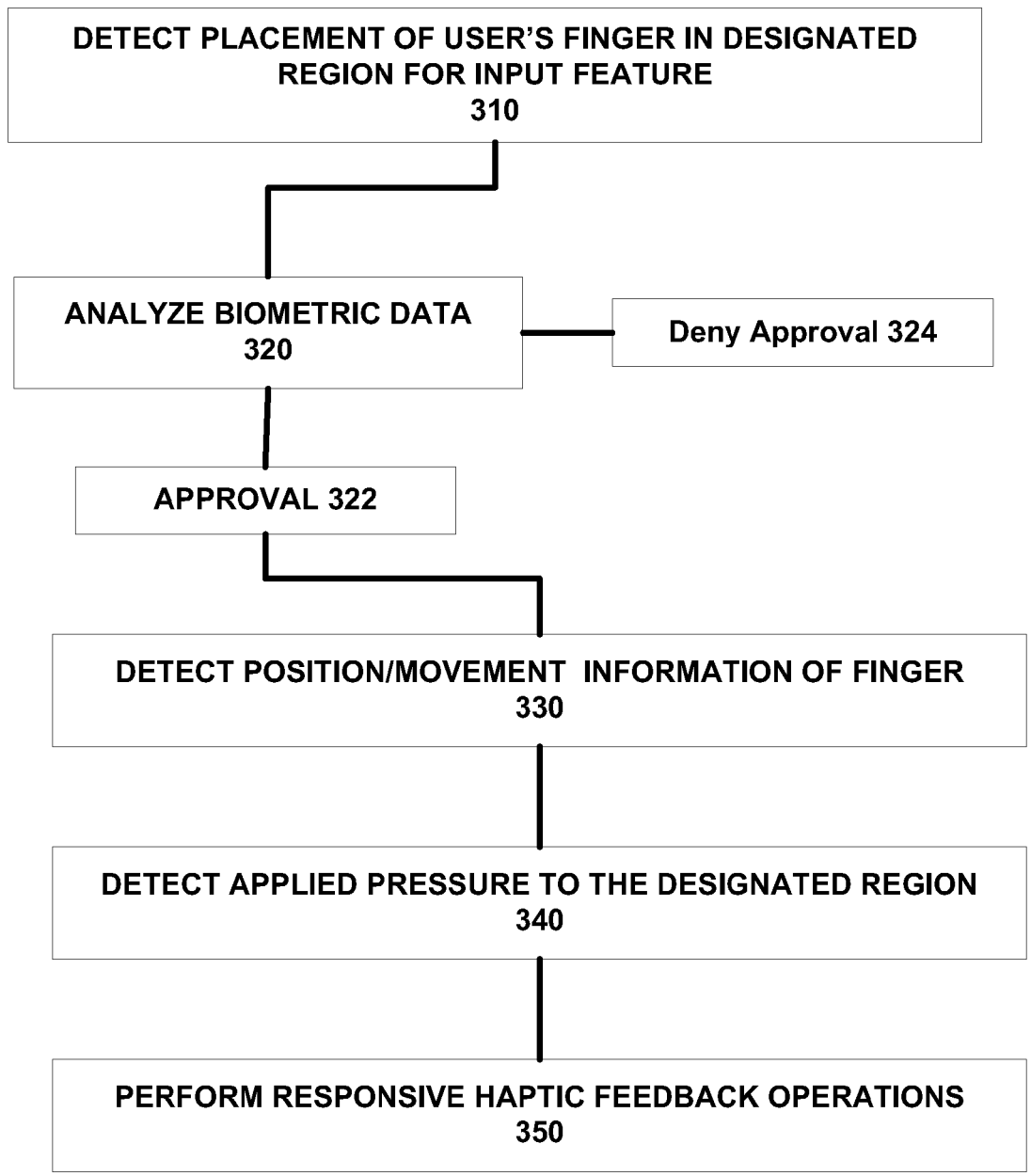
FIG. 3 illustrates processes or operations that may be performed in response to input received through a user's interaction with an input feature, under an embodiment.

FIG. 3 illustrates processes or operations that may be performed in response to input received through a user's interaction with an input feature, such as provided by embodiments described with FIGS. 1 and 2 and elsewhere in this application. In describing elements of FIG. 3, reference may be made to elements of FIG. 1 or FIG. 2 for purpose of illustrating suitable elements or components for performing processes or operations being described. The processes or operations described may be performed through use of programmatic elements, such as processors or logic (e.g. as provided by logic circuits).

According to an embodiment, at an instance 310, the user places a finger on the designated region 102 (FIG. 1). The placement of the finger may be its own action, or part of another action, such as a swipe. The input feature 202 may be operative to detect events in the designated region 102. In an embodiment in which the input feature includes the biometric sensor feature 116 (FIG. 1), a finger print or other biometric characteristics of the finger when placed on the designated region 102 is detected and analyzed.

Responsive to the user placing his finger on the designated region, the device (its processing resources or control logic) may perform the operation 320 of analyzing the biometric data to determine whether the user is approved (i.e. authorized or authenticated) or not. The analysis may be in the form of the processor 210 (FIG. 2) comparing characteristics of the finger print pattern to one or more profiles of approved finger prints. If the processor 210 (or control logic) signals approval 322, the processor may unlock the device or its components. For example, the processor 210 may enable operation of its user-interface components 240, so that the user can, for example, enter input, open applications, or see data. If the processor 210 signals disapproval 324, the processor may maintain the device in a locked state. In one implementation, approval of the user is required before other functionality of the input feature can be used. In another implementation, the approval can protect some resources of the device, but allow user access to other functionality of the device. Still further, some embodiments do not employ use of the biometric data.

The processing resources and/or control logic 110 of the device may perform the operation 330 of detecting the position or movement of the finger on the designated region for a duration of time. In an embodiment in which a resistive type sensor is used, position information may be detected. If an optical, RF or capacitive sensor is used (such as in the case of an integrated biometric position/movement sensor), an image or other data may be detected that correlates to finger velocity or motion. The finger detecting operation may detect the position/movement of the finger at the start and/or end of the swipe (e.g. range measurement), as well as record instances between, and the time for the finger to complete the swipe (e.g. velocity) or move to points between (e.g. acceleration or velocity). These attributes of the finger's interaction with the designated region 102 (FIG. 1) may reflect or be processed as various kinds of input. For example, the input may reflect a simple scroll or a magnified fast scroll action. Numerous alternatives are possible.

In one implementation, the operation 330 may be performed concurrently with, for example, detecting the biometric data. Alternatively, the operation 330 may be performed after detecting the biometric data. Still further, the operation 330 may be performed prior to approving or disapproving the user, such as in the case where the user's access to one resource (e.g. protected database) is limited, but his use of the device is not.

An operation 340 may also be performed in which the force detector 116 operates to detect applied pressure on the designated region 102. In one embodiment, the force sensor may perform the operations of detecting when the applied pressure from the user's finger exceeds a designated threshold. At such occurrence, force sensor 116 may signal an output that is registered by the control logic 110 and/or processing resources of the computing device. As an alternative, the force sensor 116 may correspond to, for example, a sensor that measures the force applied to locations or regions of the designated region 102. Thus, the sensor value from the force detector 116 may coincide with a value that indicates the magnitude of the applied pressure.

In an embodiment in which haptic feedback is used, the control logic 110 and/or processing resources of the device may perform operation 350, responsive to a designated event. The operation may correspond to an audible (e.g. clicking sound) or tactile sensation (a vibration or motion of a portion of the designated region). In one implementation, the feedback is performed in response to an event such as (i) position detection, (ii) velocity/acceleration detection, (iii) force detector output, and/or (iv) approval or disapproval from biometric data comparison. Additionally, the feedback may be altered for different events. For example, events corresponding to applied pressure exceeding a threshold may be provided an audible click, while the position/movement detection operation 330 may be provided a vibrate motion to simulate a roller or slider.

Position/Movement and Force Detect

Figure 4:
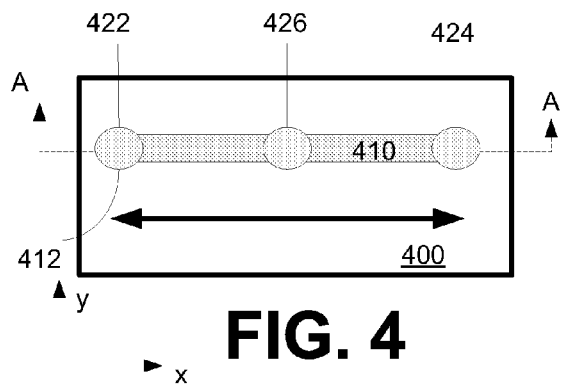
FIG. 4 illustrates a two-dimensioned input feature combination that may be applied onto a designated region of a computing device, according to an embodiment.

FIG. 4 illustrates a two-dimensional positional/movement and pressure input feature 400 combination that may be applied onto a designated region of a computing device, according to an embodiment. In an embodiment, a contact surface 410 is provided in the designated region and extended primarily along one direction (axis X in FIG. 4) so as to form a strip. Force detectors are positioned at desired locations on the contact surface 410. Force detectors, such as switches or sensors, may be provided underneath the contact surface 410 as pressure points. The pressure points may be operative to detect or measure force when the force/pressure is applied at distinct locations 412 (which may optionally be marked) in the strip 410. In this way, one embodiment enables the force sensors to simulate buttons on a conventional device.

In one embodiment, a pair of force detectors 422, 424 are positioned at ends of the strip. Such positioning enables, for example, the user to actuate (with applied pressure that exceeds a designated threshold) the force detectors as if they were traditional insertive buttons. Such actuation may be used to enable the user to enter directional input in the form of scrolling.

As an alternative or addition, a centrally positioned force detector 426 may be provided. In one implementation, the centrally positioned force detector 426 may be actuated in order to enable the user to enter selection input. Both the pair of force detectors 422, 424 and the centrally positioned force detector 426 may be implemented to enable, for example, the user to provide applied pressure to scroll or enter directional input along the direction of the X axis, as well as to enter or provide selection input.

Likewise, in one implementation, the movement of the finger on the contact surface 410 may also enable directional input. The following are illustrative examples of how the combination of the contact surface 410 and force detectors 422, 424 and/or 426 may be used:

| Action | Operation | Operation | Operation |
| --- | --- | --- | --- |
| Swipe in direction X without actuation of force sensors | directional input (scroll, navigate, move cursor) | Biometric scan (see below) | Pre-programmed swipe action |
| Center Single Press | Select | | Highlight-Place in focus |
| East/West Single Press | Scroll Left/Right | | Highlight-Place in focus |
| Center Double Press | Select | | Launch/Other |
| East/West Double Press | Select | | Fast Scroll |
| Swipe in direction X and Side Press | Approve and scroll | Fast scroll | Pre-programmed swipe and select action |

With regard to the table shown, the pre-programmed swipe action may correspond to anyone of many possible actions. For example, the action may open a favorite application or initiate a communication to a designated person.

In an embodiment in which the magnitude of the applied pressure is measured, one or more embodiments may provide that the value of the magnitude is incorporated into the operation performed in response to the detected applied pressure. For example, the magnitude of the applied pressure may cause the scrolling or navigational input to be performed with more or less intensity (e.g. fast scrolling, page jumping etc.). Numerous other variations are also possible.

Figure 5:
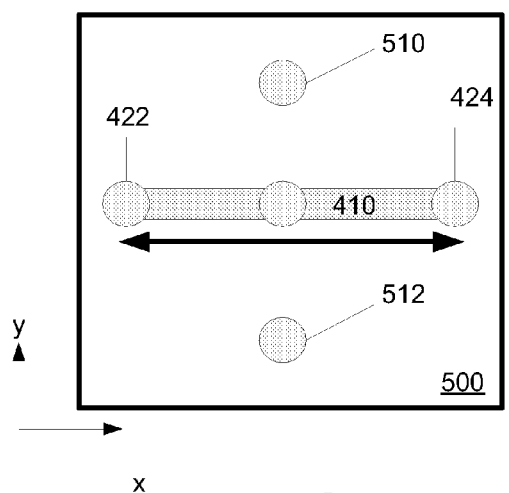
FIG. 5 illustrates another input feature combination that may be applied onto a designated region of a computing device, according to an embodiment.

FIG. 5 illustrates another input feature 500 combination that may be applied onto a designated region of a computing device, according to an embodiment. An input feature 500 may include functionality such as shown and described with FIG. 4, with addition of a pair of force detectors 510, 512 positioned on opposing ends (e.g. north and south) of a center along a Y-axis (which is orthogonal to X-axis). The force sensors 510, 512 may be actuatable similar to the pair of side sensors 422, 424 to enable, for example, directional input along the axis Y. The following additional examples may be illustrative:

| Action | Operation | Operation |
| --- | --- | --- |
| North/South Single Press | Scroll Up/Down | Highlight/Focus item |
| North/South Double Press | Select | Fast Scroll Up/Down |

Figure 6:
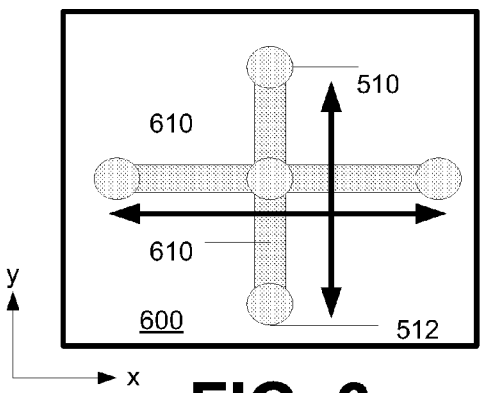
FIG. 6 illustrates another input feature combination that may be applied onto a designated region of a computing device, according to an embodiment.

FIG. 6 illustrates another input feature 600 combination that may be applied onto a designated region of a computing device, according to an embodiment. An input feature 600 may include functionality such as shown and described with FIG. 4 and FIG. 5, with addition of a vertical (along direction of Y) linear contact region 610. In an embodiment, four or five force detectors 422, 434, 426, 510 and 512 may be operational to enable 5-way directional and selection input. In addition to use force detectors, the user may enter input using a vertical swipe action. The vertical swipe action may initiate, for example, the entry of directional input, a biometric scan or a pre-programmed application or series of programmatic actions (such as opening a favorite application or calling a designated contact).

Figure 7:
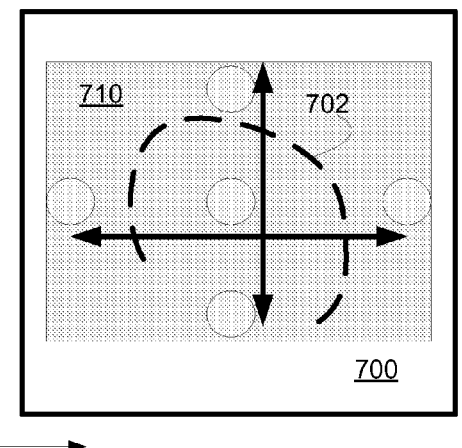
FIG. 7 illustrates another input feature combination that may be applied onto a designated region of a computing device, according to an embodiment.

FIG. 7 illustrates another input feature 700 combination that may be applied onto a designated region of a computing device, according to an embodiment. An input feature 700 may include functionality such as shown and described with FIG. 4 through FIG. 6, with addition of the position/movement contact region 710 being expanded to occupy a two dimensional space (rather than be comprised of 2 one-dimensional strips). The contact region 710 may enable, for example, horizontal or swipe input, as described with embodiments above. As an addition or alternative, the contact region 710 may enable trace input 702 or handwriting input. Numerous other alternatives may also be provided.

As an alternative or addition to embodiments described, an array of force sensors may be used. For example, an arrangement of three or four or more sensors may be provided along a diagonal. As another alternative, a multi-wire resistive force touch panel may be used as the contact region. Such an array may be used to detect measurements in designated locations of the device, so as to enable, for example, simulation of button press events.

Figure 8:
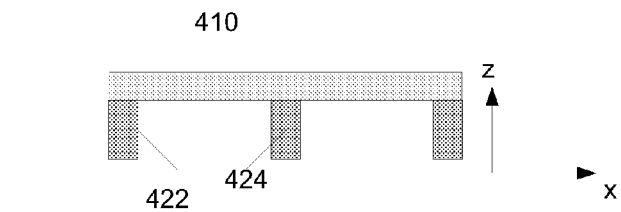
FIG. 8 is a side cross-sectional view of an input feature such as described with an embodiment of FIG. 4.

FIG. 8 is a side cross-sectional view of an input feature such as described with an embodiment of FIG. 4. The side cross-sectional view shown by an embodiment of FIG. 8 may be equally applicable to embodiments of FIGS. 5 through 7, in that the dimension of the input feature 400 as viewed along lines A-A may be the same. Thus, the description provided with an embodiment of FIG. 8 may be applicable to embodiments of FIG. 4-7.

As shown, the input feature 400 may comprise of the contact surface 410 and one or more force detectors 422, 424. The contact surface 410 may overlay the force detectors 422, 424. The force detectors 422, 424 may be triggerable with mechanical force. In one embodiment, the force detectors may correspond to snap-dome or switched elements that close (and this trigger) with application of applied pressure that exceeds a designated threshold. As an alternative, the force detectors 422 may include electrical sensors that signal force values or presence in response to a change in a physical or electrical property from the applied pressure (e.g. strain gauges).

In one embodiment, the contact surface 410 described with embodiments of FIG. 4 and FIG. 7 (including vertical contact surface 610 (FIG. 6) and contact region 710 (FIG. 7) may comprise of a capacitive or resistive layer of material that detects touch or presence on a grid with coordinates. In this way, the contact surface 410 may detect position or movement information.

However, other embodiments provide for the contact surface 410 to include integrated biometric detection capabilities. In one implementation, the contact surface 410 may comprise of an optical detector that can measure the biometric features of the user's fingers (e.g. fingerprint). Use of such an integrated component enables any of the embodiments described with FIG. 4 through FIG. 7 to serve as a biometric sensor feature. In still other embodiment, the biometric sensor feature may be provided through an independently positioned optical sensor that detects the biometric information apart from the capacitive or resistive layer that detects the finger position or movement.

Haptic Feedback

With regard to any of the embodiments described, haptic feedback may be optionally provided to further enhance the user-experience. In particular, one embodiment configures the device to use the haptic feedback in order to simulate some or all of the sensations a user feels when operating a traditional button set or device. As an addition or alternative, the haptic feedback indicates to the user when he has completed certain actions or successfully entered input. For example, in response to the user's entry of directional input when scrolling through many entries, the feedback component 118 (see FIG. 1) may output a series of clicking actions. The feedback component 118 (FIG. 1) may also emit minute vibrations to simulate presence of a structure.

Different types of haptic feedback components may be incorporated with one or more embodiments. According to embodiments, the component 118 (FIG. 1) may provide haptic feedback and be comprised of one or more of the following: (i) Piezo electric device; (ii) vibration motor; (iii) artificial muscle; (iv) solenoid; and/or (v) linear actuator. In one embodiment, the feedback component corresponds to a "clicker". The clicker may be of any type of electromechanical actuator, as described above. In some embodiments, the clicker may be formed into a diaphragm or membrane made of material that can click and/or vibrate slightly in response to either an electrical signal (such as may be provided from the control logic 110) or mechanical force (applied pressure from the user when pressing the designated region 102). The clickers may be either variable intensity driver or fixed intensity. Variable intensity driver clickers allow for variable pressure "clicks" from the user, or software clicks which can be combined with how often (e.g. frequency or pulsed patterns) the clicks occur to create various navigational feedback effects. Either type of clicker may be used in reference to embodiments that use or incorporate a clicker.

With reference to an embodiment of FIG. 8, the feedback component 118 may be provided in the form of a haptic clicker that is provided underneath the force detectors 422, 424, 426, or between the force sensors and the contact region 410. In one implementation, the haptic clicker may be signaled to actuate (i.e. 'click' or move) by the control logic 110 of the input feature.

Figure 9:
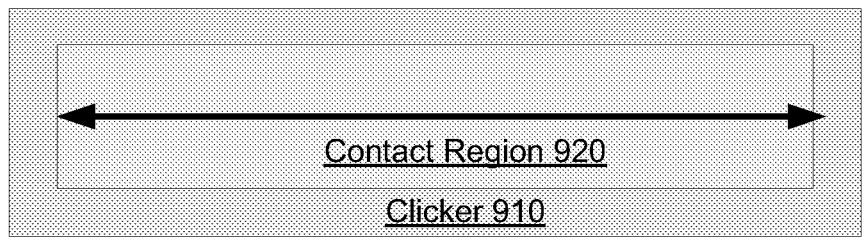
FIG. 9 illustrates an alternative embodiment in which a haptic feedback layer (i.e. a clicker) is provided in combination with, for example, a contact region, under another embodiment.

FIG. 9 illustrates an alternative embodiment in which a haptic feedback layer 910 (i.e. a clicker) is provided in combination with, for example, a contact region 920. In one implementation, the contact region 920 corresponds to that of FIG. 4 (see contact region 410) so as to be capable of detecting, for example, (i) an image of the finger placed on the contact region or in movement, or (ii) position information about the user's finger.

Optionally, the contact region 920 is configured to detect both position/movement information and biometric data about the user's finger. For example, the contact region 920 may correspond to an optical sensor that can detect position/movement information and biometric data. In such an implementation, the haptic feedback may be responsive to, for example, the user swiping his finger and being approved, or to the user entering directional input using the swipe.

As an alternative, the contact region 920 may be configured to detect biometric data, but not position/movement information. In this case, the haptic feedback may provide a shake, click or other sensation to indicate whether, for example, the user has been approved or disapproved when swiping his finger.

Figure 10:
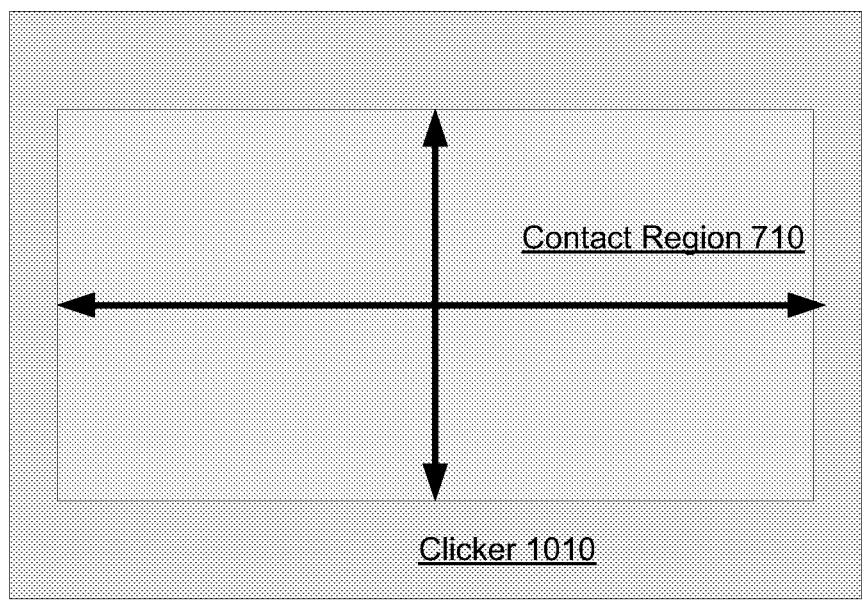
FIG. 10 illustrates an alternative embodiment in which a haptic feedback layer (i.e. a clicker) is provided in combination with, for example, the contact region, under another embodiment.

FIG. 10 illustrates an alternative embodiment in which a haptic feedback layer 1010 (i.e. a clicker) is provided in combination with, for example, the contact region 710 (see FIG. 7). In such an embodiment, the feedback layer 1010 may trigger tactile/audible response to the user's swiping action and/or to the user's entry of the trace input.

Detector Combinations

Figure 11A:
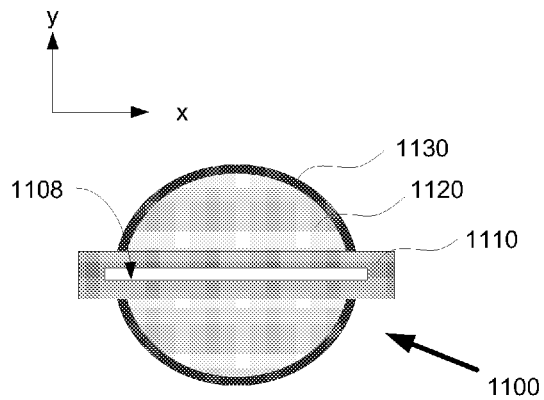
FIG. 11A illustrates an input feature that combines use of biometric characteristic detection, force detection and haptic feedback, under an embodiment.

FIG. 11A illustrates an input feature that combines use of biometric characteristic detection, force detection and haptic feedback, under an embodiment. In an embodiment, the input feature 1100 includes a biometric sensor feature 1110 that is linearly disposed along a direction of a first axis (X), a snap-dome switch 1120 (or other switch element), and a clicker 1130. The biometric sensor feature 1110 may be provided as an optical scanner that reads characteristics or attributes about the user's finger. The biometric sensor feature 1110 may detect finger placement and/or swipe over a contact region 1108.

The snap-dome switch 1120 may serve as a force detector, in that the snap-dome may have a characteristic pressure that causes its outer dome to collapse and thereby close or actuate the switch. Accordingly, snap-dome switch 1120 detects when the user's applied pressure at a location of the designated region (where the input feature 1100 is provided) exceeds a designated threshold, corresponding to the force required to cause the snap-dome collapse or trigger. In an embodiment shown, a single-snap dome is dimensioned to encompass or underlie a substantial portion of the contact region 1108. It should be noted that the size of the snap-dome 1120 is a design parameter, and it can be altered based on desired implementation characteristics. For example, the snap-dome 1120 may occupy a footprint that is smaller than and encompassed by the footprint of the biometric sensor feature.

The clicker 1130 may provide haptic feedback in the form of tactile sensation and/or an audible (i.e. 'click'). Under one embodiment, the clicker is responsive to events that include the user providing a biometric swipe (e.g. 'click' when swiped or when user is approved) and/or application of force that exceeds the designated threshold.

Optionally, the optical sensor of the biometric sensor feature 1110 may detect position/movement of the finger over the contact region 1108. This information may be interpreted as input. For example, as described elsewhere, a swipe or slide movement of the user's finger may be interpreted as directional input for scrolling or moving a cursor.

Figure 11B:
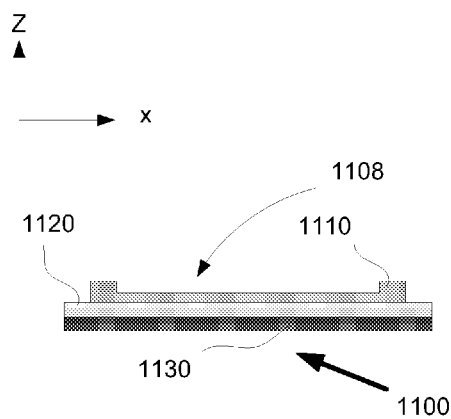
FIG. 11B representative cross-sectional view of input feature of FIG. 11A, according to an embodiment.

FIG. 11B representative cross-sectional view of input feature 1100 of FIG. 11A, according to an embodiment. According to an embodiment, the clicker 1130 underlies the snap-dome 1120. In the implementation shown, the snap-dome 1120 underlies the contact region 1108 and the optical sensor serving as the biometric sensor feature 1110 and/or position/sensor movement.

Figure 12A:
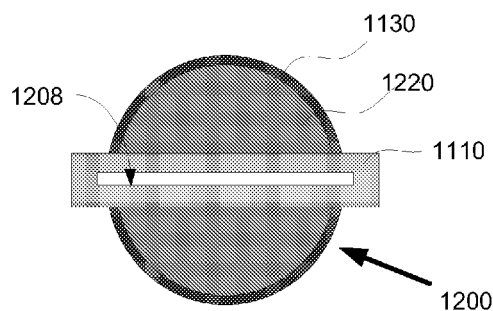
FIG. 12A illustrates an alternative input feature that combines use of biometric characteristic detection, force detection and haptic feedback, under an embodiment.

FIG. 12A illustrates an alternative input feature that combines use of biometric characteristic detection, force detection and haptic feedback, under an embodiment. The input feature 1200 may have the same construction and functions as described with embodiments of FIG. 11A, except that the force detector corresponds to a force sensor 1220 (e.g. strain sensor), rather than a snap-dome element. As with an embodiment of FIG. 11, the dimension of the force sensor 1220 may vary.

Figure 12B:
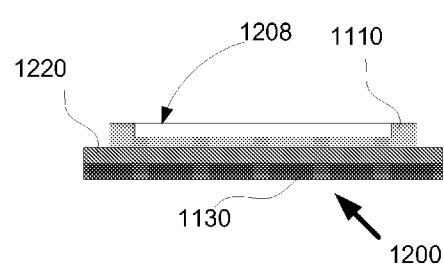
FIG. 12B representative cross-sectional view of input feature of FIG. 12A, according to an embodiment.

FIG. 12B representative cross-sectional view of input feature 1200 of FIG. 12A, according to an embodiment. The construction of the input feature 1200 may parallel that of the input feature 1100 (FIG. 11B), except the force sensor 1220 is extended over an area that underlies the contact region 1208 where the optical sensor is operative.

Figure 13A:
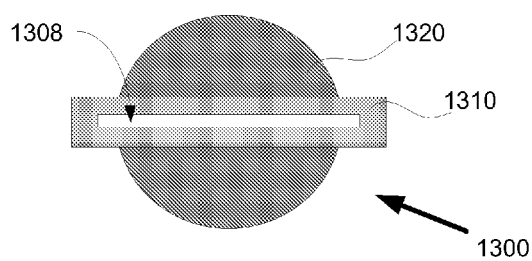
FIG. 13A illustrates another alternative input feature that combines use of biometric characteristic detection, force detection and haptic feedback, under an embodiment.

FIG. 13A illustrates another alternative input feature that combines use of biometric characteristic detection, force detection and haptic feedback, under an embodiment. In an embodiment of FIG. 13A, input feature 1300 includes a contact region 1308 that is positioned to receive a user's finger placement or swipe. One or both of a position/movement sensor and/or biometric sensor feature may be operative over the contact region 1308. As with some embodiments of FIG. 11A and FIG. 12A, an implementation provides for an optical sensor 1310 that provides both placement/movement and biometric detection functionality is used. An integrated haptic force detector 1320 may underlie the optical sensor 1310 where the contact region 1308 is provided. In one implementation, the combined haptic force detector 1320 may simultaneously trigger haptic feedback and signal the presence of an applied pressure in excess of a designated threshold.

Figure 13B:
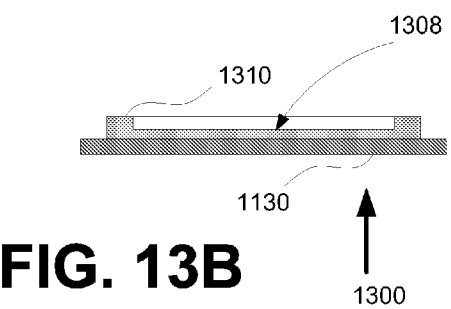
FIG. 13B a representative cross-sectional view of input feature of FIG. 13A, according to an embodiment.

FIG. 13B a representative cross-sectional view of input feature 1300 of FIG. 13A, according to an embodiment. The haptic force detector 1320 may underlie the contact region 1308. In one implementation, the haptic force detector 1320 may correspond to a clicker that has is responsive to application of force in excess of a designated threshold. As an alternative, the haptic force detector 1320 may correspond to a snap-dome or mechanical switch that has a characteristic force and which "clicks" or provides inherent feedback when it is triggered. Numerous other variations are also possible.

With regard to an embodiment such as described with FIG. 13A or FIG. 13B, or elsewhere in this disclosure, the combinations that use a force sensor may implement two-position switches. For example, one force sensor in a combination may be configured to detect light pressure versus firmer pressure. Light pressure may correspond to a first actuated position or switch event, while firm pressure corresponds to a second actuated position or event. As an example, a camera may be directed to focus in response to the first actuation event, and to capture in response to the second actuation event. Such two-position switches may be enhanced with haptic feedback to simulate, for example, a half-press button event or full press button event. As another alternative, a third or more actuation or switch events may be associated with a particular force sensor.

Multi-Way Input Feature

Figure 14:
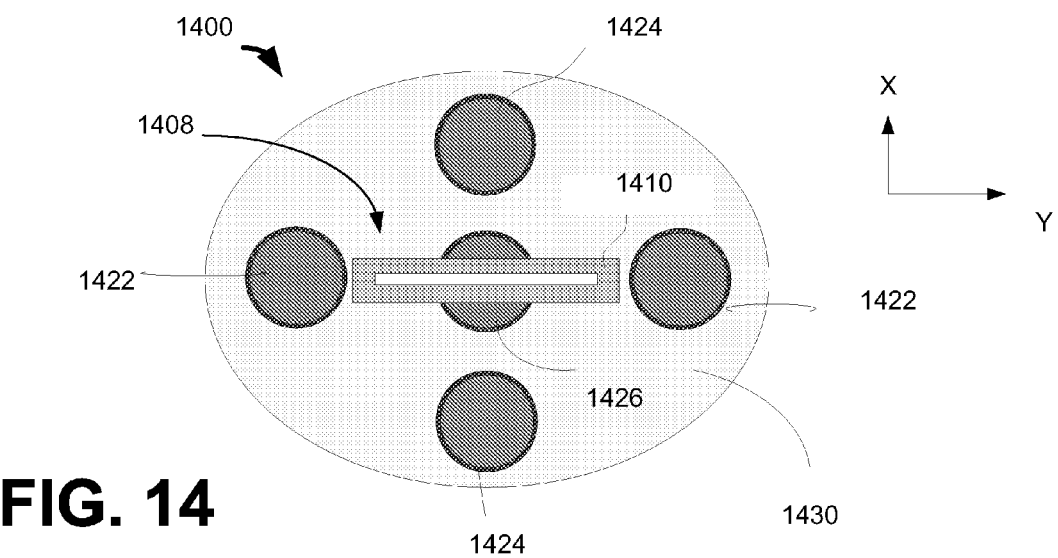
FIG. 14 illustrates another input feature that combines use of position/movement detection, biometric characteristic detection, force detection and haptic feedback, under an embodiment.

FIG. 14 illustrates a five-way input feature that combines use of position/movement detection, biometric characteristic detection, force detection and haptic feedback, under an embodiment. In an embodiment, an input feature 1400 includes comprising a one-dimensional biometric sensor 1410 that is operative over a contact region 1408, and a 5-way set of force detectors 1422, 1424, and 1426 that are distributed in the contact region 1408 along the directions of two axes (X and Y). A haptic clicker 1430 may be provided as a layer disposed either underneath the force detectors 1422, 1424, and 1426, or between the force detectors and the biometric sensor 1410.

Optionally, the biometric sensor 1410 may sense biometric characteristics and include capabilities to detect position/movement. Thus, the biometric sensor 1410 may authenticate or approve/disapprove of the user with a finger swipe. Subsequently, or at the same time, the device may receive position/movement information that indicates, for example, a range, velocity or acceleration of the finger swipe.

The set of force detectors 1422, 1424, and 1426 may be implemented in accordance with any of the embodiments described above. Accordingly, the set of force detectors 1422, 1424, and 1426 may be implemented with individually distributed force sensors or snap-dome switches. The distribution of the set of force detectors 1422, 1424, and 1426 in the 5-way configuration provides one way by which the input feature 1400 can emulate a 5-way navigation component that enables the user to enter directional input in four directions and selection input. The user can press the contact region 1408 at the east, west, north or south locations that overlay the force detectors 1422, 1424 to enter button-press type input, including to scroll or navigate in the direction of the press. The user can apply pressure to the center location 1426 to enter selection input. Thus, for example, the user can scroll entries by applying pressure to the force detectors 1422, 1424, and then select a desired entry for action by pressing the center force detector 1426.

In an implementation when position/movement detection is provided (e.g. integrated with the biometric sensor 1410), the combination of the user's finger moving in the contact region 1408 and/or the user pressing the peripheral pressure locations that overlay the force detectors 1422, 1424 may enhance or supplement one another. For example, the user's may be able to scroll using either directional input or applying pressure to the desired force detector. In the latter case, however, the user has the added ability to press and hold for maintaining a long scroll. As an alternative or addition, the action of swipe and press at a desired location may have, for example, the affect of a power or fast scroll. Numerous other variations and operations may also be performed in connection with detection of the various finger movements or actions.

Figure 15A:
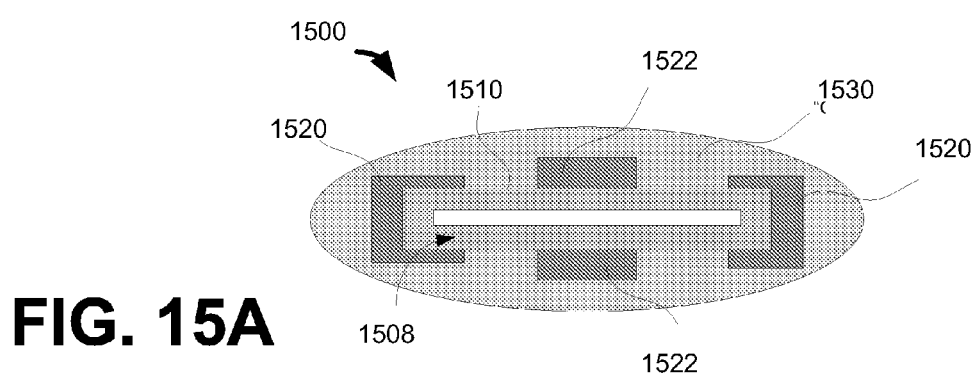
FIG. 15 illustrates a variation to an embodiment of FIG. 14, where a distribution of force sensors are used to detect different locations of finger-presses, according to an embodiment.

FIG. 15A illustrates a variation to an embodiment of FIG. 14, where a distribution of force sensors are used to detect different locations of finger-presses, according to an embodiment. Specifically, input feature 1500 may be similar to construction of embodiments shown with FIG. 14, with exception that the force detectors 1422, 1424 (FIG. 14) may be substituted for force sensors 1520, 1520, 1522 to create a 3-way input feature. Such sensors can typically detect and measure pressure even when the point-of-contact is over or proximate to another force sensor. As such, one point of contact may be detected and measured by multiple force sensors, albeit the force sensor most directly in position to the point of contact can measure the applied pressure with most accuracy. The distribution of force sensors, however, can be used in aggregate, meaning that the user can be prompted or otherwise capable of placing pressure at a point that is not directly overlaid onto a force sensor. In such instances, multiple sensors may provide measurements that enable the location of the pressure (and its magnitude) to be approximated. For example, center press actions may be detected and approximated using aggregate values provided by two or four surrounding force sensors. In this way, the center select feature may be provided without a separate fifth force sensor.

In an embodiment of FIG. 15A, a haptic clicker 1530 underlies the contact region 1508 and sensor 1510. In an embodiment, the force sensors 1520, 1522 are linearly distributed and can detect pressure applied at locations that they underlie. Additionally, the force sensors 1520, 1522 may be tuned so that more than one sensor can detect pressure applied at a given location on the contact region 1508 that does not necessarily overlap directly with one of the force sensors. Thus, according to an embodiment, the force sensors 1520, 1522 act in aggregate to detect the position of applied pressure at various locations in the contact region 1508. In one implementation, for example, the 5-way directional/selection feature may be implemented using a distribution of only three or four sensors, where at least some of the five possible points of pressure are identified by aggregating sensor values in response to pressure applied on one or more of those locations.

Figure 15B:
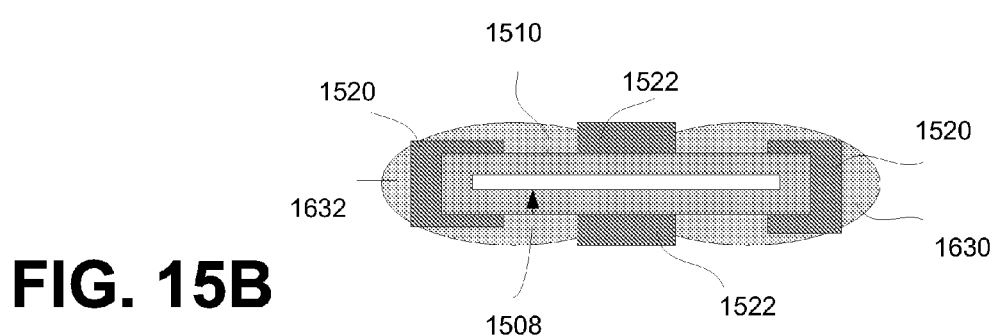

FIG. 15B illustrates a variation to an embodiment of FIG. 15A, in which multiple haptic clickers are used, under an embodiment. Specifically, input feature 1500 of an embodiment of FIG. 15B may substitute one clicker (as shown by FIG. 15A) that spans the contact region 1508 with two clickers 1530, 1532 that at least partially span the contact region 1508 and underlie the sensor 1510. Force sensors 1520, 1522 are shown in an arrangement such as provided with an embodiment of FIG. 15A, although other types of force detectors and distribution/count may be used. Among other benefits, an arrangement such as shown enables the input area to have a reduced footprint on the façade of a housing for a mobile computing device.

Figure 16A:
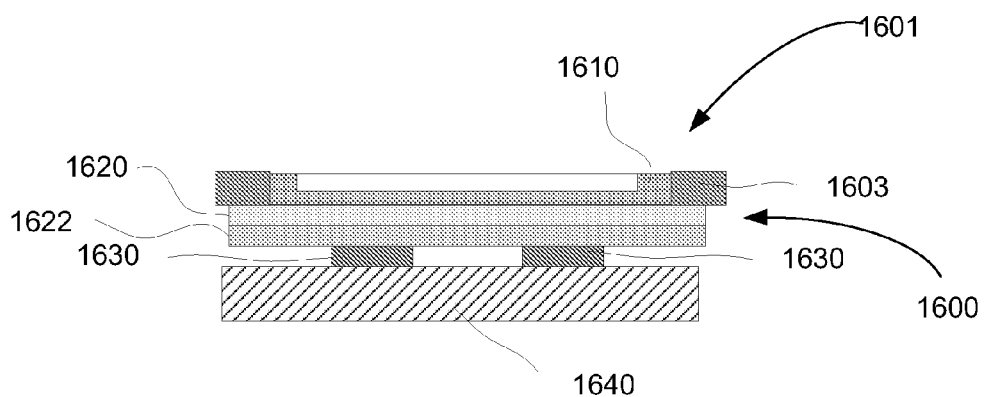
FIG. 16 illustrates a variation to an embodiment of FIG. 15, in which multiple haptic clickers are used, under an embodiment.
Figure 16B:
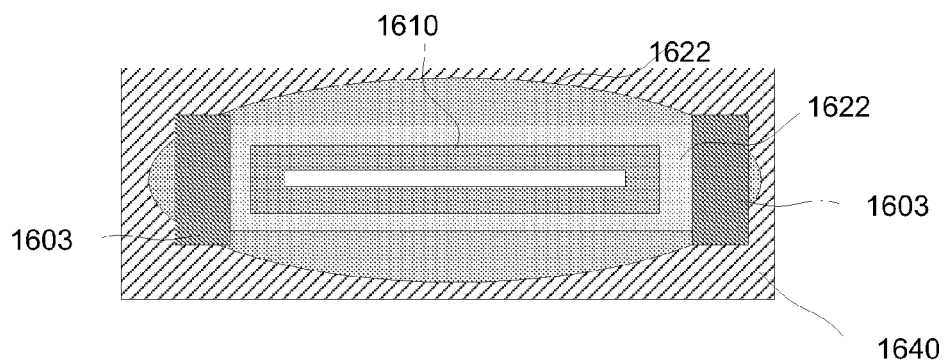

FIG. 16A and FIG. 16B illustrate another variation of a three-way input feature, as provided on a mobile computing device, according to another embodiment. In particular, FIG. 16A illustrates a side view of an input feature 1600, as provided on a mobile computing device 1601, under an embodiment. Input feature may include a position/movement sensor 1610 (which may be optical and/or capable of detecting biometric information about the user's finger) positioned on top of clicker 1620 and a set of force sensors 1630. A plate mass 1622 may be disposed between the clicker 1620 and the force sensors 1630 to provide structure. Housing elements 1603 may surround the input feature. The force sensors 1630 may rest on, for example, a substrate 1640 of the mobile computing device 1601 where the elements of the input feature communicate with processing resources of the mobile computing device 1601. In an embodiment show, a three-way input feature is created (enable press points at east, west and center) using only two force sensors. The two force sensors may be combined in aggregate to identify center press events and measurements.

FIG. 16B illustrates a top view of the input feature 1600, under an embodiment. The input feature 1600 may be provided with force sensors 1630 underlying the component. Areas where the user is to press may be separately delineated or marked.

Some embodiments described herein may use force sensors to increase or decrease the count of simulated buttons or pressure points. For example, three force sensors may be used to triangulate and identify pressure at two other points. This, three force sensors may provide either a three-way or five-way button experience.

Variations to embodiments described include combinations of features described with various embodiments. For example, the multi-pieced clicker of FIG. 15B may be incorporated with the 5-way input feature of an embodiment of FIG. 14. As another example, the plate mass 1622 of FIG. 16A may also be incorporated with any of the embodiments described herein.

Alternative Variations and Configurations

Numerous alternative variations and configurations to those illustrated with other embodiments may be used, including different combination of elements and features. FIG. 17A through FIG. 17E illustrates some of these alternatives and variations.

Figure 17A:
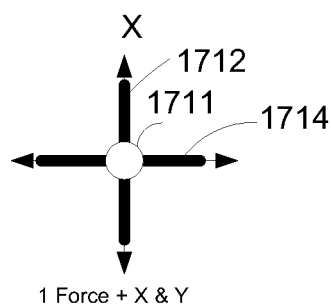
FIG. 17A is a representative illustration of an input feature that includes a combination one force sensor and two single dimension position/movement detectors.

FIG. 17A is a representative illustration of an input feature that includes a combination one force sensor and two single dimension position/movement detectors. An embodiment of FIG. 17A provides a one-way input feature for including one force detector 1711. In an embodiment, the input feature includes a centrally positioned force detector 1711 (e.g. force sensor, snap-dome) in center of a first linear position/movement sensor 1712 and in center of a second linear position/movement sensor 1714. The force detector 1711 may correspond to any force detector and position/movement sensors 1712, 1714 may be provided by any corresponding element of any embodiments described above or elsewhere. In one implementation, for example, the force detector 1711 may correspond to force detector 426 of input feature 400, snap-dome 1120 of input feature 1100 (FIG. 11A and FIG. 11B), or force sensor 1220 of input feature 1200 (FIG. 12A and FIG. 12B). The position/movement sensors 1712, 1714 may be optical (e.g. detect and use image data to determine swipe, presence or velocity of motion) or positional in form (capacitive, resistive, or RF—so as to detect position of finger at a given instance). In one embodiment, a result of a configuration such as depicted by FIG. 17A is that directional or navigation input in the east, west, north and south directions is provided through position/movement sensors 1712, 1714, while selection input is provided through user pressure applied over the force detector 1711. Optionally, as mentioned with one or more embodiments, the position/movement sensors 1712, 1714 may be integrate or use biometric detection capabilities to confirm or approve user, in addition to detecting swipe or other finger placement information.

Figure 17B:
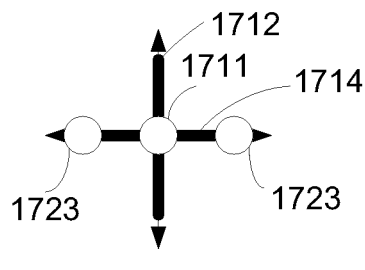
FIG. 17B is a representative illustration of an alternative input feature that includes a combination three force sensor and two single dimension position/movement detector, under an embodiment.
Figure 17C:
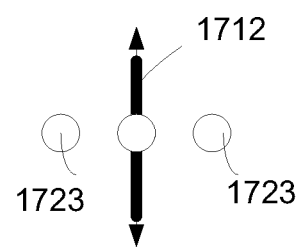
FIG. 17C is a representative illustration of an alternative input feature 1730 that includes a combination three force sensor and one single dimension position/movement detector.

FIG. 17B and FIG. 17C illustrate alternative three-way input features, providing three force detectors in combination with other elements. FIG. 17B is a representative illustration of an alternative input feature 1720 that includes a combination three force sensor and two single dimension position/movement detector. The input feature 1720 may represent a modification to that shown with embodiments of FIG. 17A, with variation that three force detectors 1711, 1723, 1723 may employed rather than one. In the example provided, the three force sensors 1711, 1723, 1723 may be distributed along either the X or Y direction. In one implementation, the user may operate the input feature 1720 by using the force detectors 1723, 1723 to enter directional input corresponding to east/west, and using the center force detector 1711 to enter selection input. The position/movement sensor 1714 may enable north/south directional input. The position/movement sensors 1712 may enable east/west directional input. Optionally, the one or both position/movement sensors 1712, 1714 may enable biometric detection. For example, the vertical position/movement sensors 1714 may be used to enable the user to enter north/south directional input, and the position/movement sensor 1712 may include or be substituted for a biometric sensor feature as described with any of the embodiments described.

FIG. 17C is a representative illustration of an alternative input feature 1730 that includes a combination three force sensor and one single dimension position/movement detector. Similar to an embodiment FIG. 17C, one embodiment provides that input feature 1730 enables the user to use force detectors 1723, 1723 to enter directional input corresponding to east/west, and use the center force detector 1711 to enter selection input. The position/movement sensors 1714 may be provided to enable north/south directional input. Optionally (or as an alternative), the position/movement sensors 1714 may include biometric capabilities.

Figure 17D:
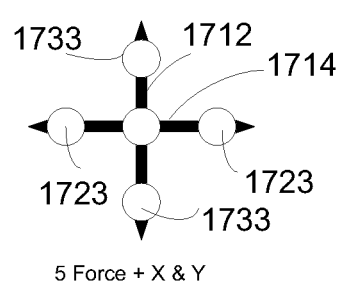
FIG. 17D and FIG. 17E illustrate alternative five-way input features, providing five force detectors in combination with other elements.
Figure 17E:
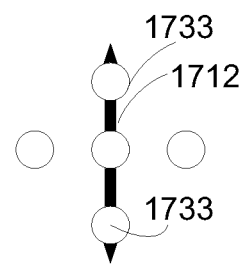

FIG. 17D and FIG. 17E illustrate alternative five-way input features, providing five force detectors in combination with other elements. In particular, FIG. 17D is a representative illustration of an alternative input feature 1740 that includes a combination five force sensors 1711, 1723, 1733 and two single dimension position/movement detectors 1712, 1714. FIG. 17E is a representative illustration of an alternative input feature 1750 that includes the combination five force sensors 1711, 1723, 1733 and one single dimension position/movement detectors 1712, 1714. Each input feature 1740, 1750 may integrate the five-way arrangement of force sensors to enable the user to apply pressure in entering north, south, east and west directional input, as well as selection input (with center force detector 1711). The position/movement detectors 1712, 1714 may enable alternative navigation or directional input. As described with other embodiments, either or both of the position/movement detectors 1712, 1714 may additionally or alternatively serve as a biometric sensor to approve or authenticate the user.

Stack Assembly for Input Feature

FIG. 18A through FIG. 18C illustrate a stack formation for component layers of a multi-dimensional input feature such as shown and described with numerous embodiments. In FIG. 18A, a clicker 1802 or other haptic feedback layer is combined with force sensor layer 1810. The force sensor layer 1810 as shown comprises of a plurality of sensors 1812, 1814. Each force sensor 1812, 1814 may be positioned to detect or measure an applied force at a given region of the contact surface 1830 (see also FIG. 18C), which may overlap or coincide with the area of the clicker 1802.

In an implementation shown by FIG. 18A through FIG. 18C, four force sensors are used to provide four or more pressure points on the contact surface. For example, each force sensor 1812, 1814 may operate to detect applied pressure on a location in the contact region 1830 (see also FIG. 18C) that directly overlays that sensor. As an alternative, two or more force sensors may also provide aggregate data that measures or quantifies pressure applied at, for example, a center region of the contact surface 1830. In this way, a five-way interface may be achieved using four force sensors. A combination of force sensors may also be used to measure applied pressure at some other region that is between regions that directly overlay the force sensors, or which do not directly overlay any force sensor region.

In FIG. 18B, another sensor layer for detecting position/movement and/or fingerprint/biometric characteristics is overlaid onto the combined layers of the clicker 1802 (FIG. 18A) and the force sensor layer 1810. In one embodiment, a fingerprint/navigation sensor 1820 is overlaid onto the force sensor layer 1810. The fingerprint/navigation sensor 1820 may be linear, meaning it accepts or interprets a swipe motion that is substantially in the direction of its length axis. The fingerprint/navigation sensor 1820 may be implemented as an optical sensor. As such, a window 1822 may be provided on the sensor to enable, for example, placement and/or motion of the user's finger tip.

FIG. 18C illustrates placement of a housing surface 1840 over the stack comprising the fingerprint/navigation sensor 1820, the force sensor layer 1810, and the clicker 1802. The housing surface 1840 is positioned to overlay the force sensor layer 1810 to avoid direct contact between the user's finger and the sensors. The construction of the housing surface 1840 (such as provided by thickness and/or material composition or rigidity) may translate force from application of a user's finger in a manner that is detectable by the underlying force sensors.

In an embodiment, the housing surface 1840 may define or otherwise accommodate application of the user's finger at designated locations that may, for example, simulate buttons. Still further, another embodiment provides that when the user's finger presses down on any region of the housing surface 1840, the combination of force sensors may identify a value and a position of the force based on measurements made by two or more of the sensors.

According to an embodiment, the housing surface 1840 is moldable in shape. In order to enhance sensitivity of the force sensors to detecting or measuring applied forces, a thickness 1832 of the surface may include structuring to facilitate translation of a force applied by the user to a corresponding one of the force sensors. In particular, an embodiment provides that the thickness 1832 include narrowing features that concentrate the force from the user into a discrete location over the force sensor layer 1810. Such a construction enables the force applied by the user to be more easily measured, and more readily translated to the clicker 1802.

Interface and Tunability

With reference to an embodiment of FIG. 2, an embodiment enables the input feature to be configurable through one of a feature user-interface 1807 or programmatic interface 1809. The use feature user-interface features 1807 or programmatic interface 1809 may be deployed with, for example, an input feature such as shown and described by FIG. 13 through FIG. 16, FIG. 17A through FIG. 17E, and FIG. 18C.

The feature user-interface 1807 may enable the user to tune the input feature 202 to preferences or configurations of the user. Among the features that may be tuned or configured to user-preferences or requirements, (i) sensitivity of the force sensors, (ii) sampling frequency or precision/accuracy of any of the sensors, (iii) the force or strength of the clicker, (iv) the operability of the biometric sensor, and (v) the degree of accuracy required from the biometric scan. For example, the user may elect to disengage some functionality from the input feature 202, such as use of the haptic feedback component or the force sensors. As an alternative or addition, the user may elect to sensitize of desensitize any of the sensor layers or sensor components, based on desired preference and/or functionality.

Likewise, the programmatic interface may activate or deactivate sensors or functionality of the input feature as a result of requirements or setting of programming components or other resources. The programmatic interface 1809 may tune or configure any of the features or characteristics of the input feature 202 described above. For example, certain applications may require full functionality from the input feature 202, while others may require less functionality. In a scenario in which an application requires the ability to access restricted data while providing 5-way navigation and selection functionality, all aspects of the input feature (such as position/movement detection, approval via fingerprint, force sensor selection) may be enabled or switched on. Other applications may disengage functionality (e.g. to save power or reduce user confusion) of one or more components of the input feature 202.

According to an embodiment, the tenability of the input feature 202 enables the feature to serve various different roles for different environments. For example, the input feature (as depicted by, for example, FIG. 14) may be employed as a central navigation device that uses four force sensors, a fingerprint sensor, and one or more haptic clickers to enable the feature to be used as a 5-way navigation mechanism or a biometric authentication mechanism.

Electrical Diagrams

Figure 19A:
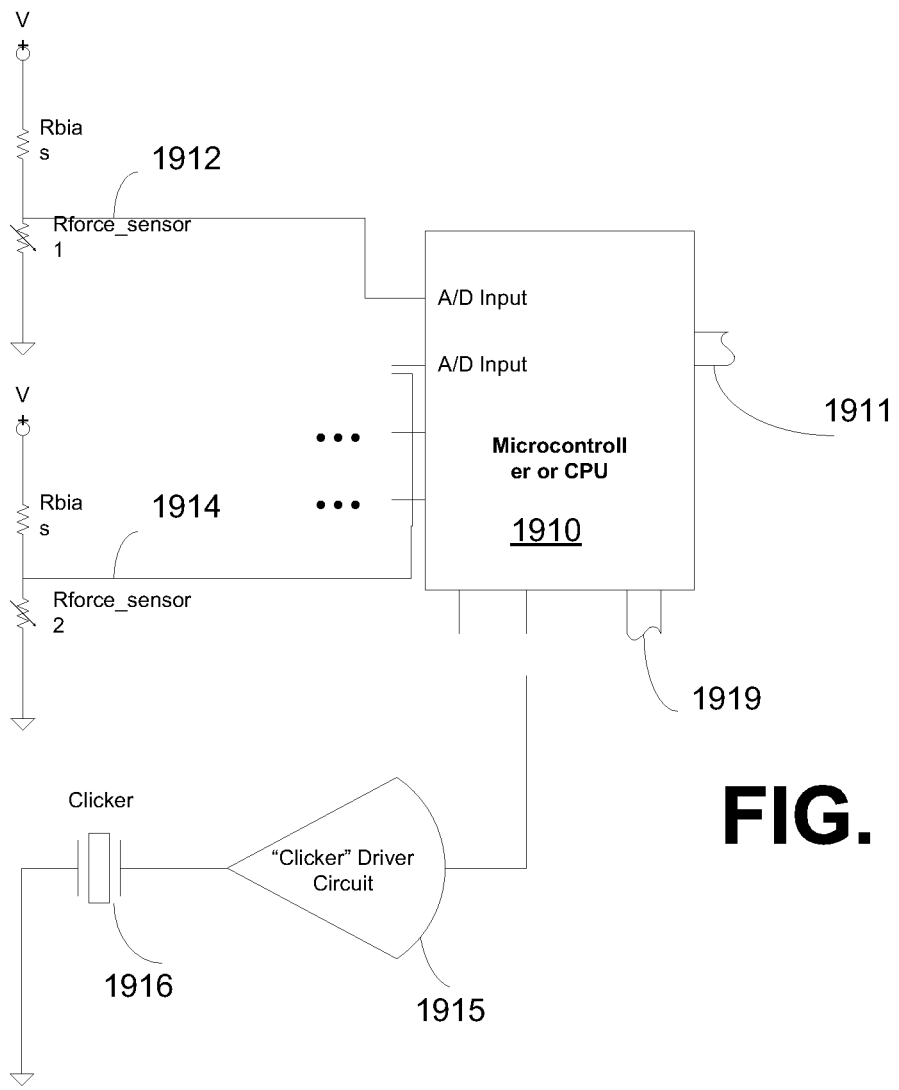
FIG. 19A illustrates a representative electrical diagrams of a two or three way input features, which use force sensors and clickers or haptic feedback, under an embodiment.
Figure 19B:
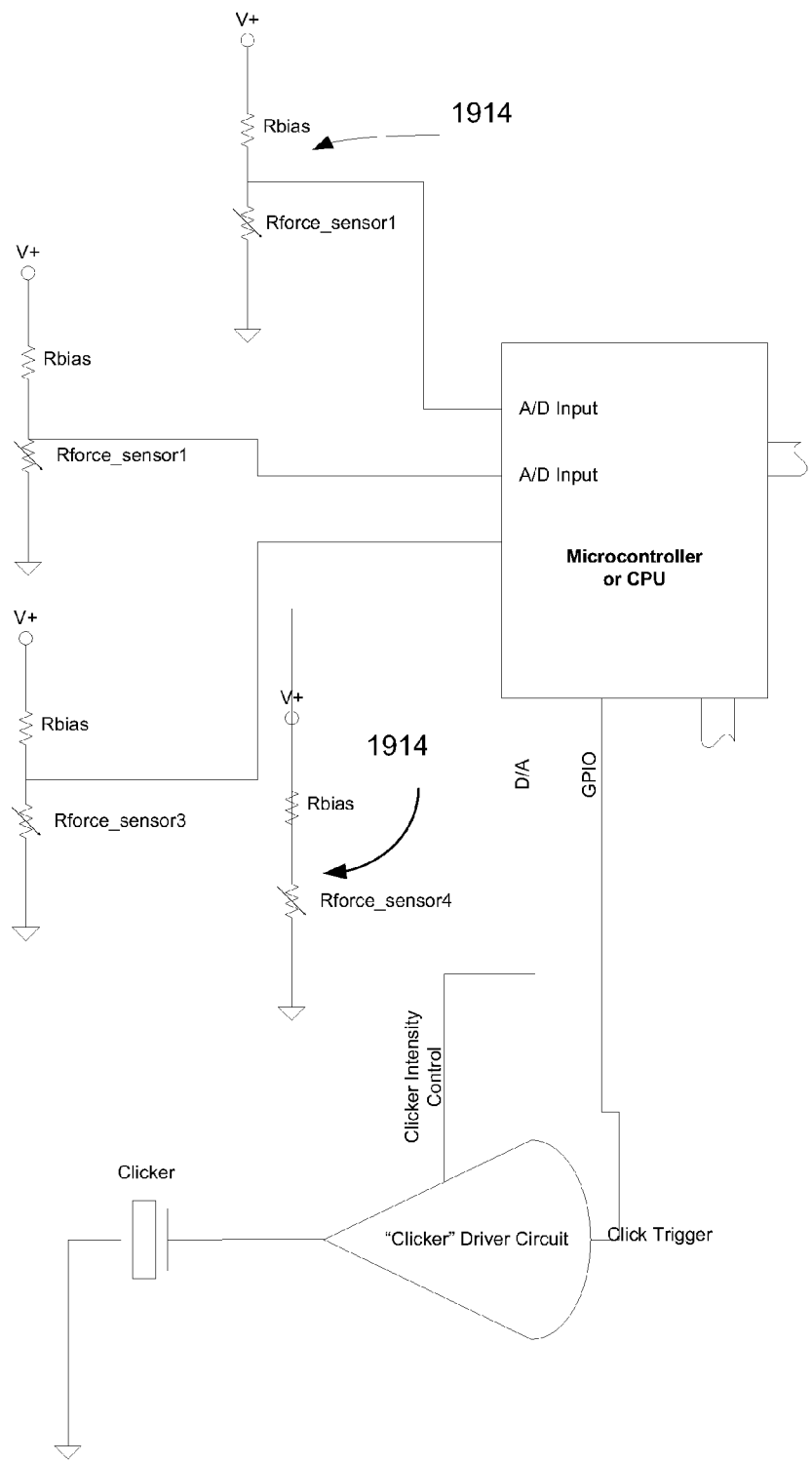
FIG. 19B illustrates a representative electrical diagrams of four or five way input feature, which use force sensors and clickers or haptic feedback, under an embodiment.

FIG. 19A and FIG. 19B illustrate representative electrical diagrams of three and five-way input features respectively, which use force sensors and clickers or haptic feedback, under an embodiment.

In FIG. 19A, control logic is implemented through a microcontroller 1910, which is connected to force sensors 1912, 1914 and to a clicker 1916. Force sensors 1912, 1914 may provide output to the microcontroller 1910 in the form of analog input, which is converted and communicated out through a bus connection. The outgoing bus lines 1911 may be provided with parallel signal lines, or serial, and extended to a central processor of the device that uses the input feature. The bus lines 1911 may be bi-directional to enable input and configuration information from software drivers (e.g. see programmatic interface 1809 of FIG. 2). The clicker 1916 may operate through a clicker driver circuit 1915 that enables the control logic to trigger tactile output events (e.g. "clicks"). The microcontroller 1910 may receive position input from the position/movement sensor (not shown) via the bus connection 1919. As an alternative or addition, the microcontroller 1910 may receive biometric input from the biometric sensor feature (which may or may not be integrated with the position/movement sensor (not shown)) via the bus connection 1919.

An embodiment of FIG. 19A may implement, for example, the input feature shown in an embodiment of FIG. 16A and FIG. 16B, as well as in FIG. 18C. Accordingly, the use of two force sensors 1912, 1914 in combination with control logic of microcontroller 1910 enables simulation of at least one other "button", for use with, for example, center-press events.

FIG. 19B illustrates an extension of an embodiment shown in FIG. 19A, with addition of additional force sensors 1922, 1924 to enable four or five-way input feature.

Mobile Computing Device with Input Feature

Figure 20A:
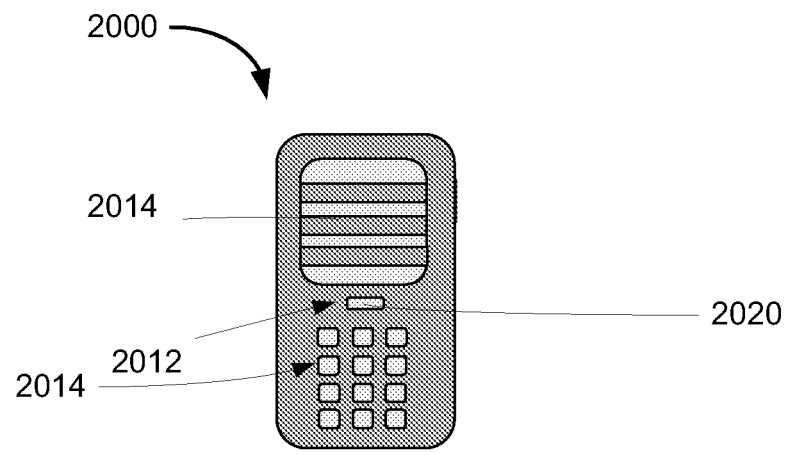
FIG. 20A illustrates a mobile computing device that is configured to include a multi-purpose detector-based input feature such as described with any of the embodiments provided herein.

FIG. 20A illustrates a mobile computing device that is configured to include a multi-purpose detector-based input feature such as described with any of the embodiments provided herein. In one implementation, a mobile computing device 2000 includes a housing 2010 having a front façade 2012 or surface. As with some other embodiments described, the mobile computing device 2000 may include cellular telephony features. Among other input features, user-interface features that may be provided on the front façade 2012 include a display 2014 and a keypad 2016. The keypad 2016 may be in the form of a dialpad (as shown), keyboard (e.g. QWERTY type keyboard for use with fingers or thumbs) or combination dialpad or keypad.

In one embodiment, an input feature 2020 such as described with embodiments detailed above is positioned on the front façade 2012. The input feature may be positioned adjacent the display 2014 to enable the user to scroll or navigate using directional input, while having the display show the results of the user input. As examples, the user may operate the input feature 2020 to scroll records (with directional input) and to select or open a given record (with selection input). The user may swipe his finger over a contact region provided by the input feature in order to enter positional/movement input and/or a biometric scan of his finger.

While an embodiment of FIG. 20A illustrates the input feature 2020 positioned beneath the display 2014, other embodiments may position the input feature elsewhere. For example, the input feature 2020 may be positioned beneath the keypad 2016. In either position, an embodiment provides that the input feature 2020 may simulate a button set that, under conventional approaches, would enable the user to enter both directional and selection input.

Figure 20B:
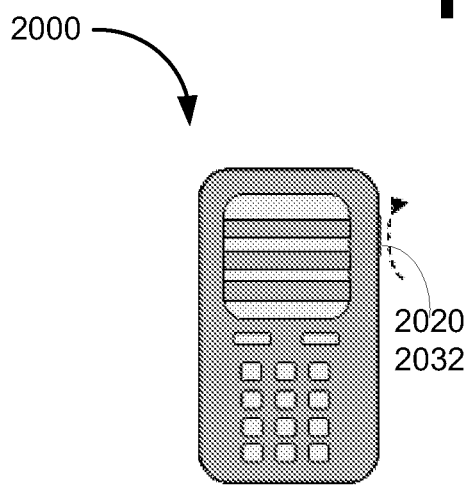
FIG. 20B illustrates a multi-purpose detector-based input feature provided on a side surface of a computing device in order to simulate a scroll wheel or similar feature, under an embodiment.

FIG. 20B illustrates a multi-purpose detector-based input feature provided on a side surface of a computing device in order to simulate a scroll wheel or similar feature, under an embodiment. In FIG. 20B, the input feature 2020 may be positioned on a side surface 2032 of the housing. In such a configuration, the input feature 2020 may simulate a wheel type input mechanism that, under conventional construction, enable scrolling or directional input with wheel spinning action, and selection input with insertion action. A finger swipe of the contact region provided on the side surface 2032 may be used for directional input. For example, detected spatial characteristics from the finger swipe may be translated into radial input and used to determine a magnitude and direction for the directional input. The contact region on the side of the housing may also be pressed to enable the user to enter selection input.

It is contemplated for embodiments described herein to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computing device comprising:
   a biometric sensor feature having a contact region provided on a surface of the biometric sensor feature, the contact region including a first dimension that extends along a first axis and a second dimension that extends along a second axis, the biometric sensor feature to detect one or more characteristics of a finger of a user in response to the user swiping the finger along a direction of the first axis on the contact region;
   a position sensor integrated with the biometric sensor to detect, on the contact region, position information of the finger or movement information of the finger along at least the direction of the first axis;
   a force detector to detect applied pressure on the contact region; and
   control logic that is coupled to or integrated with the biometric sensor feature and the position sensor to (i) use the one or more detected characteristics of the finger to approve or disapprove the user, and (ii) once the user is approved, receive input corresponding to the finger being moved on the contact region;
   wherein the control logic is coupled to or integrated with the force detector to receive input from the force detector corresponding to the finger being pressed against the contact region with an applied pressure of a given magnitude.

2. The computing device of claim 1, wherein the control logic is configured to unlock the device in response to approving the user, and wherein the input corresponding to the finger being moved on the contact region is used to perform one or more operations on the computing device.

3. The computing device of claim 1, wherein the control logic is configured to enable the approved user to lock the computing device.

4. The computing device of claim 1, wherein the control logic enables access to one or more protected resources that are available on or with use of the device in response to approving the user.

5. The computing device of claim 1, wherein the force detector corresponds to one or more force sensors.

6. The computing device of claim 5, wherein the control logic is configured to (i) detect a measurement of the applied pressure detected by the one or more force sensors, and (ii) interpret an input based at least in part on the measurement of the applied pressure.

7. The computing device of claim 6, wherein the control logic is configured to identify one of a plurality of possible locations on the contact region where the applied pressure is proximate to, and to interpret the input based at least in part on the measurement of the applied pressure by using the identified location.

8. The computing device of claim 1, wherein the force detector corresponds to one or more snap-domes.

9. The computing device of claim 1, wherein the position sensor detects, on the contact region, one or more of a range, velocity, or acceleration of a movement of the finger.

10. The computing device of claim 1, further comprising:
a feedback component that is triggerable to provide a user-detectable feedback that includes at least one of an audible or tactile sensation; and
wherein the control logic is coupled to the feedback component and in response to detecting the input corresponding to the finger being moved on the contact region, triggers the feedback component to provide the feedback.

11. The computing device of claim 10, wherein the feedback component is mechanical.

12. The computing device of claim 10, wherein the feedback component corresponds to a device comprising one or more of (i) a piezo-electric device, (ii) a vibration motor, (iii) an artificial muscle, (iv) a solenoid, or (v) a linear actuator.

13. The computing device of claim 1, wherein the biometric sensor feature, the position sensor, and the force detector, and at least a portion of the control logic is integrated as part of an integrated input feature.

14. The computing device of claim 1, wherein at least a portion of the control logic is integrated or provided with a processor of the computing device.

15. The computing device of claim 1, further comprising a processor that is configured to use the input corresponding to the finger being moved on the contact region to perform a scroll or navigate operation.

16. The computing device of claim 1, further comprising a processor that is configured to use the input from the force detector to perform a selection operation.

17. A computing device comprising:
a biometric sensor feature having a contact region provided on a surface of the biometric sensor feature, the contact region including a first dimension that extends along a first axis and a second dimension that extends along a second axis, the biometric sensor feature to detect one or more characteristics of a finger of a user in response to the user swiping the finger along a direction of the first axis on the contact region;
a position sensor integrated with the biometric sensor to detect, on the contact region, position information of the finger or movement information of the finger along at least the direction of the first axis;
a feedback component that is triggerable to provide a user-detectable feedback that includes at least one of an audible or tactile sensation; and
control logic that is coupled to the biometric sensor feature, the position sensor, and the feedback component in order to (i) compare the one or more detected characteristics of the finger with characteristics or information stored in a memory about one or more known users in order to approve or disapprove the user, (ii) once the user is approved, receive input corresponding to the finger being moved on the contact region, and (iii) in response to receiving the input, trigger the feedback component to provide the feedback.

18. The computing device of claim 17, further comprising:
a force detector to detect applied pressure on the contact region that exceeds at least a first threshold;
wherein the control logic is coupled to the force detector to receive input from the force detector corresponding to the finger being pressed against the contact region with applied pressure that exceeds the first threshold.

19. The computing device of claim 18, wherein the force detector corresponds includes one or more force sensors.

20. The computing device of claim 18, wherein the force detector corresponds to one or more snap-domes.

21. The computing device of claim 17, wherein the position sensor detects, on the contact region, one or more of a range, velocity, or acceleration of movement of the finger.

22. The computing device of claim 17, wherein the control logic is configured to enable the approved user to lock the computing device.

23. The computing device of claim 17, wherein the biometric sensor feature includes an optical sensor.

24. The computing device of claim 18, wherein the contact region, the biometric sensor feature, the feedback component, and the force detector are integrated as one input feature on a surface of the computing device.

25. The computing device of claim 24, wherein at least a portion of the control logic is integrated with the input feature.

26. The computing device of claim 17, wherein at least a portion of the control logic is integrated or provided with a processor of the computing device.

27. The computing device of claim 17, further comprising a processor that is configured to use the input corresponding to the finger being moved on the contact region to perform a scroll or navigate operation.

28. The computing device of claim 18, further comprising a processor that is configured to use the input from the force detector to perform a selection operation.

29. A computing device comprising:
a biometric sensor feature that is integrated with a designated region of the computing device and to detect one or more characteristics of a finger of a user in response to the user swiping the finger along a direction on the designated region, the designated region being contact sensitive and operable to detect position information about the finger along a direction of at least a first axis;
a force detector to detect applied pressure on one or more areas of the designated region; and
control logic that is coupled to the designated region to receive input from the designated region corresponding to the finger being moved along the direction of at least the first axis of the designated region, the control logic being coupled to or integrated with the biometric sensor feature to use the one or more detected characteristics of the finger to approve or disapprove a user;

wherein the control logic is coupled to the force detector to receive input from the force detector corresponding to the finger being pressed against the designated region.

30. The computing device of claim 29, wherein the control logic is configured to (i) detect a measurement of the applied pressure detected by the force detector, and (ii) interpret an input based at least in part on the measurement of the applied pressure.

31. The computing device of claim 29, wherein the control logic is configured to identify one of a plurality of possible locations in the designated region where the applied pressure is proximate to, and to interpret the input based at least in part on a measurement of the applied pressure by using the identified location.

32. An input feature for a computing device, the input feature comprising:

a stack assembly provided with a designated region on a surface of the computing device, the stack assembly comprising (i) a biometric position information sensor to detect position information and biometric characteristics of a user's finger in response to the user swiping the finger along a direction on the designated region, and (ii) one or more force detectors to measure or detect an applied pressure of the finger at one or more locations of the designated region, the one or more force detectors being positioned underneath the biometric position information sensor; and control logic that is coupled to the stack assembly, the control logic to use the biometric characteristics of the finger to unlock the computing device in order to enable the user to operate the computing device, wherein the control logic performs one or more operations based on the detected position and the detected pressure.

33. The input feature of claim 32, further comprising a feedback mechanism that provides one of an audible or tactile feedback to the user, wherein the feedback mechanism is positioned underneath the biometric position information sensor relative to the surface of the computing device.

34. The input feature of claim 32, wherein the one or more force detectors are positioned underneath the biometric position information sensor relative to the surface of the computing device.

35. The input feature of claim 32, wherein the feedback mechanism is a clicker.

36. The computing device of claim 1, wherein one or more characteristics of the biometric sensor is configurable by the user.

37. The computing device of claim 17, wherein one or more characteristics of the biometric sensor is configurable by the user.

38. The computing device of claim 29, wherein one or more characteristics of the biometric sensor is configurable by the user.

* * * * *

UNITED STATES PATENT AND TRADEMARK OFFICE
CERTIFICATE OF CORRECTION

PATENT NO. : 8,482,381 B2
APPLICATION NO. : 12/184241
DATED : July 9, 2013
INVENTOR(S) : Manjirnath Chatterjee et al.

Page 1 of 1

It is certified that error appears in the above-identified patent and that said Letters Patent is hereby corrected as shown below:

In the Claims

In column 22, line 30, in Claim 21, delete "of" and insert -- of a --, therefor.

Signed and Sealed this
Twenty-fourth Day of September, 2013

Teresa Stanek Rea
*Deputy Director of the United States Patent and Trademark Office*